March 31, 1942. H. HOEBER ET AL Re. 22,056

PICKER CHECK FOR LOOMS

Original Filed Dec. 27, 1939

Inventors
Harold Hoeber
Alfred F. Jacob
by Fleury Calhoun & Woodbury
Att'ys.

Reissued Mar. 31, 1942

Re. 22,056

UNITED STATES PATENT OFFICE 22,056

PICKER CHECK FOR LOOMS

Harold Hoeber, South Dartmouth, and Alfred F. Jacob, North Adams, Mass., assignors to Textile Research Company, Boston, Mass., a corporation of Massachusetts Original No. 2,263,923 dated November 25, 1941, Serial No. 311,154, December 27, 1939. Application for reissue January 9, 1942, Serial No. 426,191

3 Claims. (Cl. 139—169)

This invention pertains to looms, and relates more especially to improved check means operative to bring the shuttle to rest in the shuttle box.

One important limiting factor in the development of high-speed looms is the difficulty of stopping the shuttle accurately and without rebound in the shuttle box. While the idle picker stick and the binders or other shuttle-engaging elements of the shuttle box may be depended upon in low-speed looms to stop the shuttle with reasonable certainty and accuracy in the box, they are not adequate to perform this function acceptably when the speed of the loom is as great as is now frequently employed. The check strap which determines the idle position of the picker is usually of organic material and subject to variation in dimensions by reason of moisture changes and thus the idle position of the picker may vary slightly from time to time. Since at very high speeds the momentum of the shuttle is great, such slight variations in the idle position of the picker have a magnified effect upon shuttle rebound, and thus even though the picker check may be so carefully set at one time as to insure reasonable accuracy in stopping the shuttle, this setting may not be permanent, and under slightly different atmospheric conditions the shuttle may be found to rebound at the end of the pick. While spring-actuated checks have heretofore been proposed, we are not aware of any which has proven commercially acceptable prior to our present invention, in particular because the springs which have previously been employed have been so arranged and applied that they soon crystallize and break under the conditions of use. On the other hand, the binder of the shuttle box, if set close enough to prevent rebound of the shuttle at very high speeds, may offer so much resistance that the shuttle will fail fully to enter the box, a matter which is very serious, particularly at the replenishing side of an automatic loom. However, if the shuttle does actually stop at the proper point in the box, the power required to eject it from a box having a tight binder may be excessive.

The present invention has for its principal object the provision of a check device not appreciably affected by moisture conditions and which is operative gradually to slow down the shuttle as it enters the box and to stop it at an accurately predetermined position, but which does not consume power as the shuttle leaves the box at the beginning of the next pick.

A further object of the invention is to provide such a check device which may be applied to existing looms without substantial change in the latter and which is of simple, durable and inexpensive type and which is also capable of adjustment to fit varying conditions of use.

Figure 1:
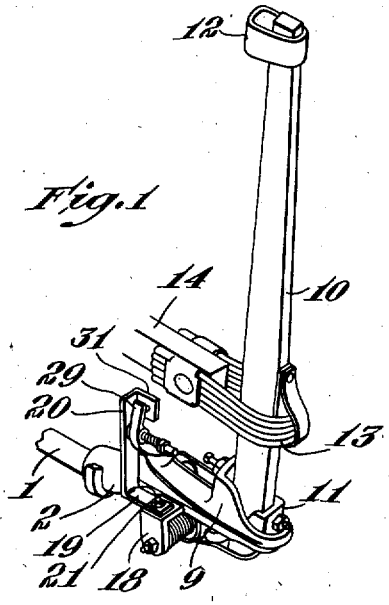
Figure 3:
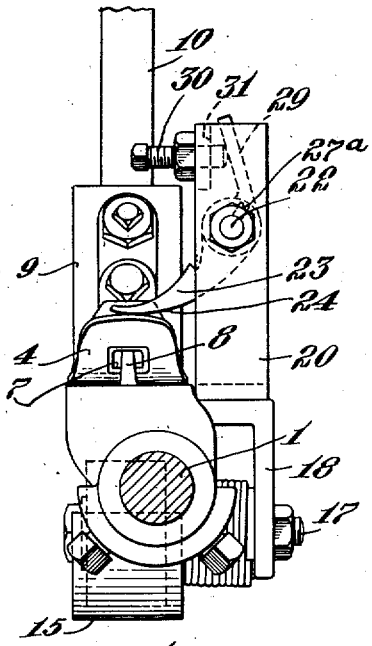
Figure 2:
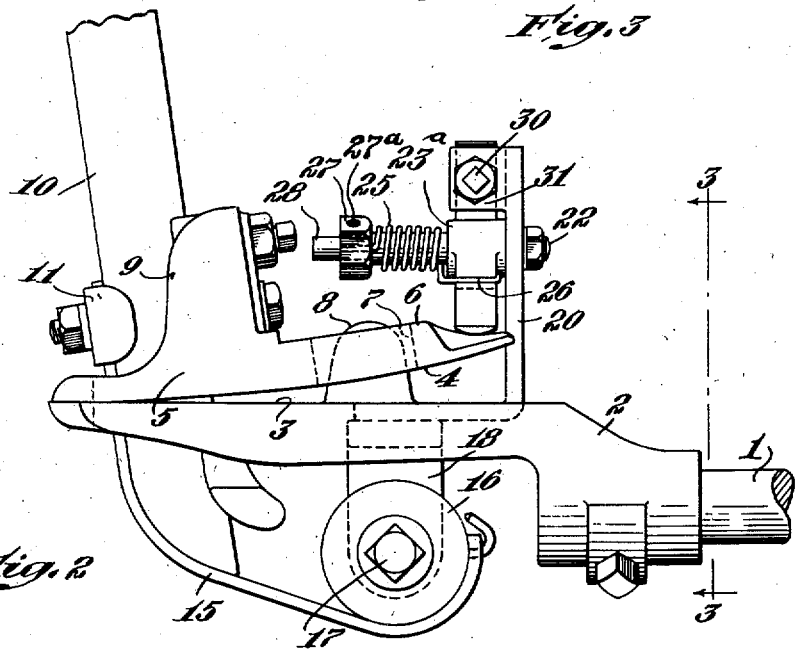

Other and further objects and advantages of the invention will be pointed out in the following more detailed description and by reference to the accompanying drawing, wherein Fig. 1 is a fragmentary perspective view of the picker stick of a loom with some of the adjunctive parts, and showing the check device of the present invention arranged in operative relation to the picker stick;

Fig. 2 is a fragmentary side elevation, to larger scale, showing the same parts as appear in Fig. 1 but viewed from the opposite side, the parts being in the position which they occupy at the instant at which the check device begins to act; and Fig. 3 is a vertical section substantially on the plane of the line 3—3 of Fig. 2.

Referring to the drawing, the numeral 1 designates the usual lay-rocker-shaft which extends from side to side of the loom and to which the lay swords or supporting rods are secured, and to the opposite ends of which are fixed the rocker stands 2 (but one of which is here illustrated). The rocker stand has an elongate substantially flat upper surface 3 on which rests the curved lower surface 4 of the rocker 5, the latter comprising the elongate toe portion 6 having therein a narrow vertical slot 7 which receives a positioning lug 8 projecting up from the surface 3 of the rocker stand.

The rocker also comprises the upstanding socket portion 9 which receives the lower end of the picker stick 10, the latter being securely fixed in the socket by means of a clamp 11. The picker 12 is secured to the upper end of the picker stick 10, and at an intermediate point the picker stick is embraced by the lug strap 13, which is connected by the link 14 to the picker arm (not shown), by means of which the shuttle picking motion is imparted to the picker stick.

To the lower part of the picker stick is attached one end of a flexible strap 15, the opposite end of which is wound about a spring drum 16 journaled on a stub shaft 17 carried by a bracket 18 which extends laterally and then downwardly from the main part of the rocker stand 2 of which it forms an integral extension. All of the above elements are of substantially usual and conventional construction and need no further detailed description.

In accordance with the present invention a support, here shown as comprising a horizontal foot portion 19 and an upright portion 20, is mounted upon the laterally extending part of the bracket 18, the foot 19 being secured to the bracket in any desired manner. This support may, for example, be integral with the bracket, but for convenience in supplying the improved check device of the present invention to existing looms, it is preferred to make the support as a separate part and to attach its foot portion 19 to the bracket 18 by means of a bolt 21 (Fig. 1) or the like.

The upright portion 20 of the support has an opening in which is fixed one end of a stub shaft 22 on which turns the hub 23[a] (Fig. 2) of a check lever. This check lever includes a laterally and downwardly directed check arm 23 having a curved cam-like lower surface 24 (Fig. 3) which overlies the upper surface of the toe 6 of the rocker 4. An open-coiled helical spring 25 is coiled about the stub shaft 22 at the left-hand side of the hub 23[a], as viewed in Fig. 2, and has one end 26 hooked about the arm 23 (which is preferably notched to receive it) and has its other end fixed to a blank nut or collar 27 which engages the smooth end portion 28 of the stub shaft 22. Preferably the stub shaft 22 is shouldered at a predetermined distance from its left-hand end, as viewed in Fig. 2, thereby to limit movement of the nut and thus to prevent undue tensioning of the spring 25. The blank nut 27 is provided with a set screw 27[a] by means of which it may be fixed to the part 28, and it may be turned, for varying the tension of spring 25, by the use of a wrench.

The check lever also comprises the upper or abutment arm 29 with which cooperates an adjustable stop screw 30 passing through a threaded opening in an ear 31 projecting from the upper part of the upright 20.

It is to be understood that an improved check device such as just described will be installed at each end of the loom.

When the shuttle enters the shuttle box at either side of the loom it engages the usual binder and is thereby somewhat retarded. However, when the device of the present invention is used, the binder may be arranged to allow greater freedom of the shuttle in the box than is usual, so that in picking, the shuttle may be ejected from the box with less expenditure of power than is ordinarily necessary. In any event, if the binder be properly adjusted, the shuttle will continue on into the box until it engages the picker. The impact of the shuttle swings the picker stick to the left, as viewed in Fig. 2, causing the toe end 6 of the rocker 4 to rise. By proper adjustment of the stop screw 30 the check arm 23 may be initially set so as to be contacted by the toe 6 of the rocker at any desired point during the left-hand swing of the picker under the impact of the shuttle, and by adjusting the spring 25 the degree of resistance offered by the check arm 23 in opposing upward swing of the rocker toe 6, after the latter contacts the arm 23, may be predetermined. As the toe 6 of the rocker continues to rise after contact with the check arm 23, the spring 25 offers a constantly increasing resistance to movement of the picker stick, and if the spring 25 be properly adjusted, the shuttle will quickly be brought to rest at an accurately predetermined location in the shuttle box. The spring herein employed and as above described is of the so-called "helical twist" type, functioning by winding or unwinding similarly to a spiral or clock spring. For opposing movement of a part such as the rocker toe which travels in a path of substantial extent, such a helical twist spring, with its coils initially widely spaced, is far longer lived than an ordinary compression or tension spring used under such circumstances.

The check device herein described is not affected by moisture, it is easily applied to existing looms, it is strong, durable and cheap to make and apply, and is readily adjustable to different conditions of use.

While one desirable embodiment of the invention has herein been illustrated and described by way of example, it is to be understood that the invention is not necessarily limited to the precise details of construction herein described, but is to be regarded as broadly inclusive of any and all equivalent arrangements falling within the scope of the appended claims.

We claim:

1. In a loom of the kind wherein the picker stick is carried by a rocker resting upon a rocker stand, and having means tending to swing the picker stick oppositely to its shuttle picking movement, the rocker having a toe portion which rises as the picker rocks in response to impact of the shuttle, in combination a picker check device mounted on the rocker stand and comprising a check lever having a downwardly inclined cam arm which lies in the path of and which is engageable by the toe of the rocker as the latter rises, an open-coiled helical-twist spring normally urging said check arm toward the toe of the rocker, and stop means operative to determine the normal position of the check arm.

2. In a loom of the kind wherein the picker stick is carried by a rocker resting upon a rocker stand, and having means tending to swing the picker stick oppositely to its shuttle picking movement, the rocker having a toe portion which rises as the picker rocks in response to impact of the shuttle, in combination a support secured to the rocker stand, a stub shaft projecting from the support, a check lever mounted on the stub shaft, said lever having an arm which extends transversely of the path of and which is engageable by the toe of the rocker as the latter rises, a spring normally urging said check arm toward the rocker toe, means for adjusting the tension of the spring, an abutment element fixed to the check lever, and an adjustable stop engageable with said abutment for predetermining the normal position of the check lever arm relative to the toe of the rocker.

3. In a loom of the kind having a picker stick fixed at its lower part to a rocker which rests upon a rocker stand, the rocker having a toe portion which rises when the picker stick swings in response to shuttle impact, in combination a support fixed to the rocker stand, the support comprising an upright portion having fixed thereto a stub shaft, a check arm having a hub which turns on said shaft, the check arm being disposed in the path of and engageable by the toe of the rocker as the latter rises, an open-coiled spring embracing the stub shaft and having one end connected to the check arm and its opposite end secured to a part which is rotatably mounted on the stub shaft, and means for fixing said rotatable part in adjusted position on the shaft, the check lever also having an abutment arm, and an adjustable stop screw having threaded engagement with a part of said support and having its end disposed for engagement with the abutment arm, thereby adjustably to determine the normal spacing of the check arm from the toe of the rocker when the picker occupies its normal idle position.

HAROLD HOEBER.
ALFRED F. JACOB.